March 4, 1952 C. M. HYMAN 2,587,851
ADJUSTABLE SHAFT HANGER
Filed Nov. 16, 1949
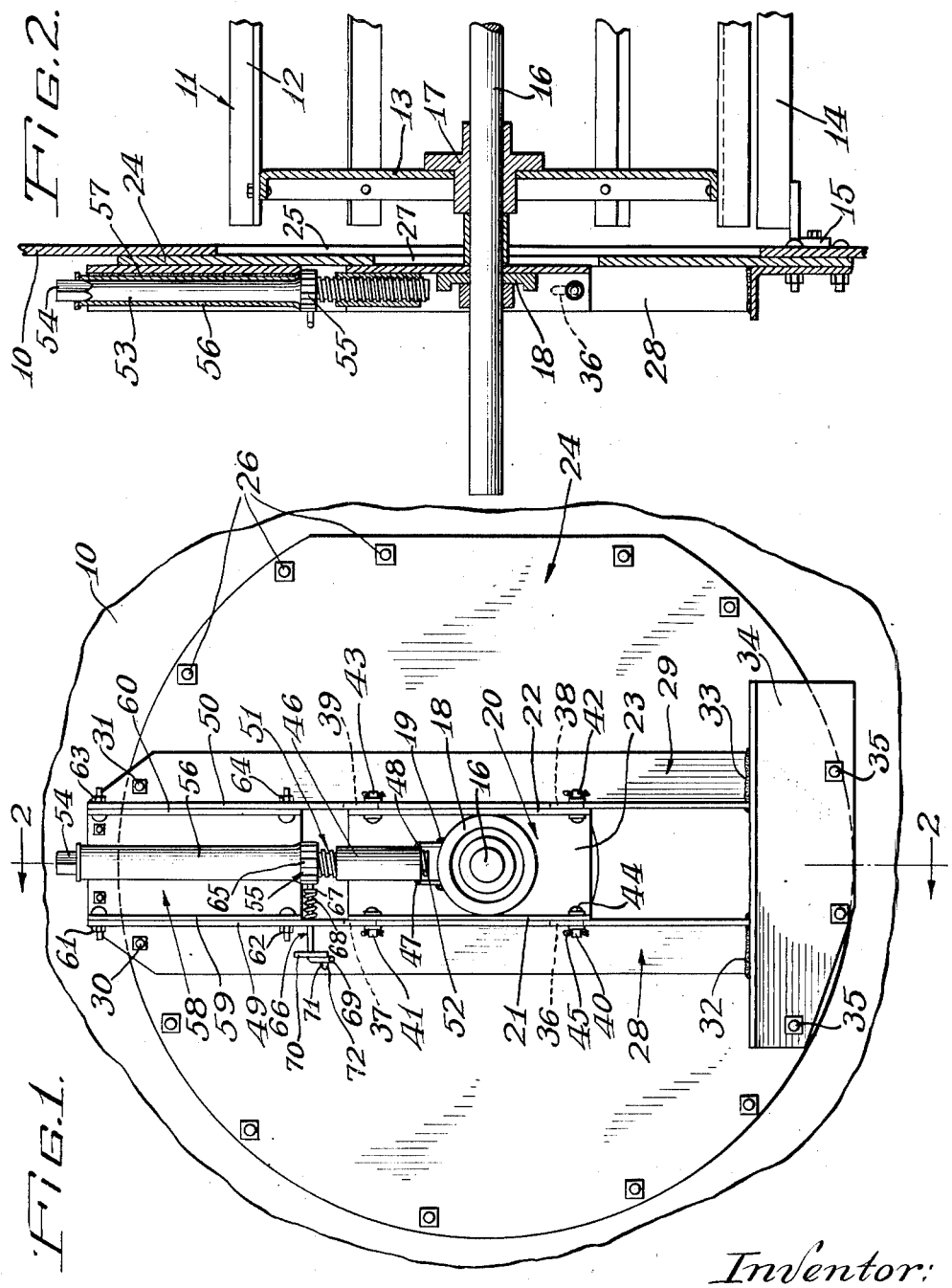
Inventor:
Charles M. Hyman
Paul O. Pippel
Atty.

Patented Mar. 4, 1952

2,587,851

UNITED STATES PATENT OFFICE 2,587,851

ADJUSTABLE SHAFT HANGER

Charles M. Hyman, Davenport, Iowa, assignor to International Harvester Company, a corporation of New Jersey Application November 16, 1949, Serial No. 127,710

3 Claims. (Cl. 308—33)

This invention relates to a new and improved thresher cylinder adjusting mechanism.

Thresher cylinders cooperate with a concave or the like to thresh or otherwise remove husks or hulls from grains. Thus the spacing between the cylinder and concave plays an important factor in the successful threshing of grains. There have been numerous mechanisms employed to regulate threshing cylinder adjustment but invariably these adjustments have required removal or at least loosening of numerous bolts making it a major operation in adjusting the cylinder. The operators of threshing machines have thus been reluctant to make cylinder adjustments for change in grain conditions or change in the type of grain. Further, cylinder adjustment must be very accurate and must remain in adjusted position through extremely rough vigorous treatment.

It is a principal object of the present invention to provide a simple and efficient means of threshing cylinder adjustment.

An important object of this invention is the provision of threaded means for slidably adjusting a threshing cylinder in small increments.

Another important object of this invention is to supply a spring retained locking means which is manually shiftable to permit rotational movement of a threaded member which causes raising and/or lowering of a threshing cylinder depending upon the direction of rotation of the threaded member.

Another and further important object of this invention is to provide an adjusting mechanism for a threshing cylinder including a guide member and a cylinder journal member slidable with respect to the guide member by rotation of a screw means.

A still further important object of this invention is the provision of a screw member for adjusting the position of a threshing cylinder and having an annular series of notches in a collar formed integrally with the screw member engageable by a spring-retained detent, whereupon the cylinder may be vertically adjusted and locked in any desired position.

Another and still further important object of this invention is to provide a journal support for a threshing cylinder which is adjustable in small increments throughout a predetermined range of movement.

Other and further important objects of this invention will become apparent from the disclosures in the following specification and accompanying drawing.

In the drawing:

Fig. 1 is a side elevational view of the cylinder adjusting mechanism of this invention.

Fig. 2 is a sectional view taken on the line 2—2 of Fig. 1.

As shown in the drawing:

The reference numeral 10 indicates generally a supporting structure which in the present case constitutes the side walls of a threshing machine. A cylinder 11 having a plurality of cross-bars 12 extending between spaced hubs or spider members 13 cooperate with a concave 14 carried by the supporting structure 10 as shown by the bracket member 15. The cylinder 11 is provided with a centrally disposed shaft 16 upon which are fastened the hubs 13 as shown at 17. The shaft 16 projects laterally through the side wall 10 of the threshing machine and adjustment of the cylinder 11 with respect to the threshing concave 14 is accomplished by raising and/or lowering the shaft 16.

The shaft 16 is carried in a journal bearing 18 which as shown in Figure 1 is fastened by welding or the like 19 to a slide member 20. The slide member is U or channel shaped having upwardly extending spaced side walls 21 and 22 and an intermediate bottom member 23. As shown in Figure 4, there is provided a large substantially round cover plate 24 for enclosing an opening 25 formed in the side wall 10 of the threshing machine whereby upon removal of the cover plate 24 the entire threshing cylinder may be withdrawn from the machine and serviced or replaced as necessary. The cover plate 24 is fastened by means of a plurality of bolt members 26 positioned around the periphery of the cover to the supporting structure 10. The slide member 20 is mounted over an opening 27 formed in the cover plate 24 and thus the cylinder shaft 16 along with its journal bearing 18 and the entire slide member may freely move upwardly and downwardly with respect to the side wall 10 of the thresher and similarly with respect to the concave 14 for accomplishing the threshing of various grains.

As best shown in Fig. 1, the slide member 20 is positioned between spaced guide members 28 and 29 which are attached to the cover plate 24 by means of bolt members 30 and 31 and welds 32 and 33 abutting an angle member 34 which in turn is fastened to the cover plate 24 by means of bolt members 35. The guide members 28 and 29 constitute a fixed channel track for the slide member 20. The guide member 28 is provided with elongated slots 36 and 37 and similarly the guide member 29 is provided with elongated slots 38 and 39. The slide member 20 is provided with outwardly extending pin members 40 and 41 on one side and 42 and 43 on the other side. The pins 40 and 41 project outwardly through the elongated slots 36 and 37 in the guide member 28 and the pins 42 and 43 extend outwardly through the elongated slots 38 and 39 in the guide member 29. Movement of the slide member 20 is thus limited to the length of the elongated slots 36, 37, 38, and 39. Each of the pins extending outwardly through the guide members 28 and 29 is provided with a head 44 on the inside of the slide member 20 and a removable cotter pin or the like 45 on the outside of the guide member.

The slide member 20 is provided with an internally threaded sleeve 46 welded or otherwise fastened thereto as shown at 47 and 48. The sleeve 46 lies parallel to the side walls 21 and 22 of the channel shaped guide member 20 and similarly is parallel to and centrally disposed between the upwardly extending side walls 49 and 50 of the guide members 28 and 29 respectively. The sleeve 46 constitutes a receiving means for a screw 51. The screw member 51 includes a threaded lower portion 52 threadedly engaging the internal threads of the sleeve 46 as best shown in Figure 2, an upwardly extending shank portion 53, a wrench engaging top 54, and an intermediate notched collar 55. The cylindrical shank portion 53 is journally housed within a sleeve member 56 which is fastened by means of welding or the like 57 to a U-shaped bracket member 58. The bracket 58 includes upwardly extending side walls 59 and 60 lying adjacent the walls 49 and 50 of the guide members 28 and 29. The bracket 58 is fixedly attached to the guide members by means of bolts 61, 62, 63, and 64.

The collar or annular shoulder 55 of the screw 51 is provided with regularly spaced notches 65 around the circumference thereof. A pin 66 is slidably journaled through an opening in the wall 49 of the guide member 28 and is adapted to engage any of the notches 65 to lock the screw member 51 against rotation. The pin or detent 66 is provided with a collar 67 and a spring 68 disposed between the wall 49 and the collar 67, thus urging the pin into engagement with one of the notches 65. A hand engaging portion 69 on the outer end of the pin 66 is provided to manually effect release of the pin 66 from a notch 65 by pulling against the action of the spring 68. In order to more accurately guide the pin 66, a bracket or post member 70 is attached by means of welding or the like 71 to the guide member 28 spaced from the wall 49. The bracket 70 is equipped with an opening in axial alignment with the opening in the wall 49, so that the pin 66 may freely slide into and out of the notches 65. The bracket 70 is provided with an outwardly extending stepped projection or flange 72 to enable the operator of the machine to pull the detent 66 out of engagement with the notches 65 and hook the hand engaging portion 69 thereover thus maintaining the pin 66 out of engagement with the collar 55 and permitting free rotation of the screw member 51.

In operation, the operator of the threshing machine may conveniently adjust his cylinder 11 with respect to the concave 14 by means of releasing the detent 66 from the locking collar 55 and thereupon applying a wrench to the upper extension 54 of the screw member 51. Rotation of the screw member 51 causes the slide member 20 with its integral journal 18 for the cylinder shaft 16 to slide upwardly or downwardly depending upon the direction of rotation of the screw member within limits defined by the elongated notches 36, 37, 38, and 39 in the track guide members 28 and 29. When the desired adjustment of the cylinder is completed, the latch member 66 is permitted to reengage one of the many notches on the periphery of the collar 55, thereupon locking the low pitched screw member 51 and thus the cylinder shaft 16 in fixed position with respect to the supporting structure 10. It is preferable that the notches 65 be calibrated with respect to the stationary sleeve 56 as indicated by the inscribed line 73 on the sleeve 56. With such proper calibration the operator may change the adjustment of the cylinder 11 by turning the screw member 51 and stopping at any one of the notches 65 which denotes the desired spacing of the cylinder with its concave.

Numerous details of construction may be varied throughout a wide range without departing from the principles disclosed herein, and I therefore do not propose limiting the patent granted hereon otherwise than as necessitated by the appended claims.

What is claimed is:

1. A shaft adjusting mechanism comprising a supporting structure, a shaft carried by said supporting structure, a journal member for rotatably receiving said shaft, a guide member, means for slidably mounting said journal member with respect to said guide member, screw receiving means fastened to said journal member, screw means arranged and constructed to engage said screw receiving means, and means fastened to said supporting structure for journally receiving said screw means and holding the screw means against longitudinal movement, whereby rotation of said screw means effects a raising or lowering of said shaft depending upon the direction of rotation of said screw means, means locking the screw means against rotation after small increments of movement, and said means for locking the screw means against rotation including a collar integral with said screw means and having regularly spaced notches around the circumference thereof, and a spring urged pin slidably journaled in said supporting structure and adapted to normally engage one of said notches whereby rotation of said screw means is prohibited until the pin is withdrawn from the notch against the action of the spring.

2. A mechanism as set forth in claim 1 in which means is provided on said supporting structure for holding said pin in out-of-notch engaging position.

3. A shaft adjusting mechanism comprising a supporting structure, a shaft positioned in said supporting structure, a journal member for rotatably receiving said shaft, a channel shaped guide fastened to said supporting structure, a slide member carried within said channel shaped guide, said journal member fixedly mounted on said slide member, means limiting relative sliding movement of the slide member within said channel shaped guide, said means including elongated slots in said channel and pins in said slide member loosely passing through the elongated slots in the channel, an internally threaded sleeve fastened to said slide member, a sleeve fixed to said channel shaped guide and spaced from said internally threaded sleeve and in axial alignment therewith, a screw member journaled in said sleeve and threadedly engaging said internally threaded sleeve, collar means integral with said screw member and located between the sleeve and the internally threaded sleeve, said collar means having spaced notches around the periphery thereof, lock means to hold the screw member against rotation, said lock means including a pin slidably mounted through said channel shaped guide and arranged and constructed to engage one of the notches in said collar means, a collar on said pin, a spring on said pin and disposed between the channel shaped guide and said collar whereby the spring normally urges the pin into collar means notch engagement, handle means for withdrawing said pin from one of said notches, and means for effecting rotation of said screw member when the pin is withdrawn to cause raising or lowering of the journal member by sliding movement of the slide member.

CHARLES M. HYMAN.

REFERENCES CITED

The following references are of record in the file of this patent:

UNITED STATES PATENTS

| Number | Name | Date |
|---|---|---|
| 1,172,011 | Cooper | Feb. 15, 1916 |
| 2,318,188 | Anderson et al. | May 4, 1943 |
| 2,334,944 | Millard et al. | Nov. 23, 1943 |
| 2,310,282 | Gauss | Feb. 9, 1943 |
| 2,376,618 | Paradise et al. | May 22, 1945 |